(12) United States Patent
Runnestrand et al.

(10) Patent No.: US 6,463,387 B1
(45) Date of Patent: Oct. 8, 2002

(54) 3-D SEISMIC EVENT TRACKING

(75) Inventors: Scott A. Runnestrand, Bartlesville, OK (US); Dennis B. Neff, Bartlesville, OK (US); Kevin H. Northey, Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 110 days.

(21) Appl. No.: 09/774,500

(22) Filed: Jan. 31, 2001

(51) Int. Cl.[7] .................................................. G01V 1/28
(52) U.S. Cl. ......................................................... 702/16
(58) Field of Search ............................. 702/14, 17, 16, 702/12, 13; 367/73

(56) References Cited

U.S. PATENT DOCUMENTS

| | | |
|---|---|---|
| 4,633,401 A | 12/1986 | Flinchbaugh |
| 5,453,958 A | 9/1995 | Neff |
| 5,771,170 A | 6/1998 | Withers et al. |
| 5,831,935 A | 11/1998 | Luo et al. |
| 5,987,388 A | 11/1999 | Crawford et al. |

Primary Examiner—Donald E. McElheny, Jr.
(74) Attorney, Agent, or Firm—Richmond, Hitchcock, Fish & Dollar

(57) ABSTRACT

In accordance with the present invention, there is disclosed herein a method of seismic interpretation that is designed to improve the quality and speed with which an explorationist can pick and interpret a seismic section or volume. The instant invention utilizes unseeded picking to create a collection of patches or areas of similar-character reflector picks. The method is unsupervised initially and builds an output database that preferably contains the time and amplitude of each "assigned" event, an assigned event being a seismic reflection that is determined to be similar in some sense to its neighboring traces. Then, during subsequent interpretation the explorationist quickly builds an interpretation by utilizing and selecting from the pre-assembled collections of similar traces stored in the database.

18 Claims, 7 Drawing Sheets

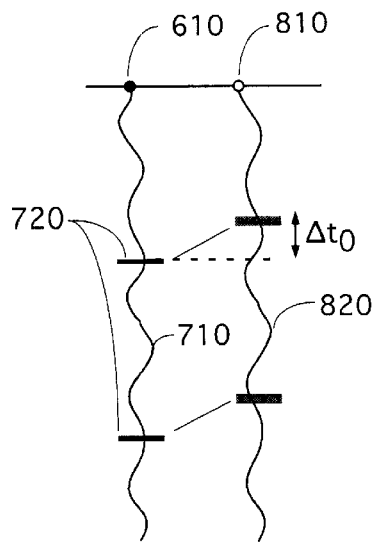
FIGURE 8
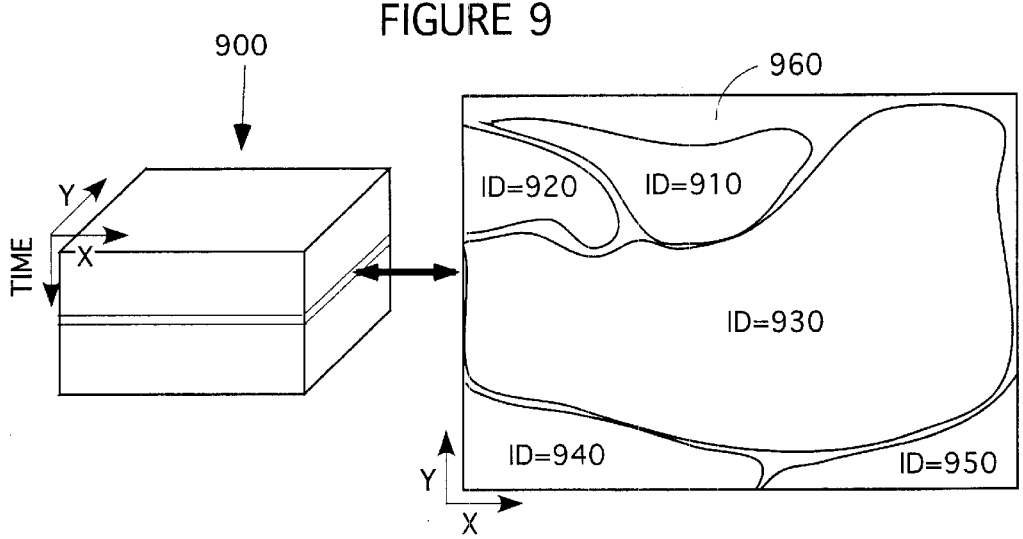
FIGURE 10
| ID NO. | TIME(MS) | IN-LINE | X-LINE | AMP. |
|---|---|---|---|---|
| 201 | 1100 | 506 | 171 | 26.201 |
| 201 | 1103 | 507 | 171 | 28.303 |
| 201 | 1104 | 508 | 171 | 26.981 |
| ⋮ | ⋮ | ⋮ | ⋮ | ⋮ |
| 820 | 1360 | 151 | 161 | 31.112 |
FIGURE 9

3-D SEISMIC EVENT TRACKING

TECHNICAL FIELD

This invention relates to the general subject of seismic exploration and, in particular, to seismic interpretation and to methods for improving the quality of picked and interpreted seismic data.

BACKGROUND OF THE INVENTION

The broad goal of a seismic survey is to image or map the subsurface of the earth by sending energy down into the ground and recording the "echoes" that return from the rock layers below. The source of the down-going sound energy might come, for example, from explosions or seismic vibrators on land, or air guns in marine environments. During a seismic survey, the energy source is systematically positioned at a variety of locations near the surface of the earth above a geologic structure of interest. Each time the source is activated, it generates a seismic signal that travels downward through the earth, is partially reflected, and, upon its return, is recorded at a great many locations on the surface. The seismic signals are partially reflected from discontinuities of various types in the subsurface (including reflections from "rock layer" boundaries) and the reflected energy is transmitted back to the surface of the earth where it is recorded as a function of travel time. The sensors that are used to detect the returning seismic energy are usually geophones (land surveys) or hydrophones (marine surveys). The recorded returning signals, which are at least initially continuous electrical analog signals which represent amplitude versus time, are generally quantized and recorded as a function of time using digital electronic so that each data sample point may be operated on individually thereafter.

Multiple source activation/recording combinations are subsequently combined to create a near continuous profile of the subsurface that can extend for many miles. In a two-dimensional (2D) seismic survey, the recording locations are generally laid out along a single straight line, whereas in a three dimensional (3D) survey the recording locations are distributed across the surface in a grid pattern. In simplest terms, a 2D seismic line can be thought of as giving a cross sectional picture (vertical slice) of the earth layers as they exist directly beneath the recording locations. A 3D survey produces a data "cube" or volume that is, at least conceptually, a 3D picture of the subsurface that lies beneath the survey area. In reality, though, both 2D and 3D surveys interrogate some volume of earth lying beneath the area covered by the survey.

A seismic survey is composed of a very large number of individual seismic recordings or traces. In a typical 2D survey, there will usually be several tens of thousands of traces, whereas in a 3D survey the number of individual traces may run into the multiple millions of traces. Chapter 1, pages 9–89, of *Seismic Data Processing* by Ozdogan Yilmaz, Society of Exploration Geophysicists, 1987, contains general information relating to conventional 2D processing and that disclosure is incorporated herein by reference. General background information pertaining to 3D data acquisition and processing may be found in Chapter 6, pages 384–427, of Yilmaz, the disclosure of which is also incorporated herein by reference.

A modern seismic trace is a digital recording (analog recordings were used in the past) of the acoustic energy that has been reflected from inhomogeneities or discontinuities in the subsurface, a partial reflection occurring each time there is a change in the acoustic properties of the subsurface materials. The digital samples that make up the recording are usually acquired at 0.002 second (2 millisecond or "ms") intervals, although 4 millisecond and 1 millisecond sampling intervals are also common. Each discrete sample in a conventional digital seismic trace is associated with a travel time, and in the case of reflected energy, a two-way travel time from the source to the reflector and back to the surface again, assuming, of course, that the source and receiver are both located on the surface. Many variations of the conventional source-receiver arrangement are used in practice, e.g. VSP (vertical seismic profiles) surveys, ocean bottom surveys, etc. Further, the surface location of every receiver in a seismic survey is carefully tracked and is generally made a part of the recorded trace (as part of the trace header information). This allows the seismic information contained within the traces to be later correlated with specific surface and subsurface locations, thereby providing a means for posting and contouring seismic data—and attributes extracted therefrom—on a map (i.e., "mapping").

The data in a 3D survey are amenable to viewing in a number of different ways. First, horizontal "constant time slices" may be extracted from a stacked or unstacked seismic volume by collecting all of the digital samples that occur at the same travel time. This operation results in a horizontal 2D plane of seismic data. By animating a series of 2D planes it is possible for the interpreter to pan through the volume, giving the impression that successive layers are being stripped away so that the information that lies underneath may be observed. Similarly, a vertical plane of seismic data may be taken at an arbitrary azimuth through the 3D volume by collecting and displaying the seismic traces that lie along the path of selected azimuth. This operation, in effect, extracts an individual 2D seismic line from within the 3D data volume.

Seismic data that have been properly acquired and processed can provide a wealth of information to the explorationist, who is one of the individuals within an oil company whose job it is to identify potential drilling sites. For example, a seismic profile gives the explorationist a broad view of the subsurface structure of the rock layers and often reveals important features associated with the entrapment and storage of hydrocarbons such as faults, folds, anticlines, unconformities, and sub-surface salt domes and reefs, among many others. During the computer processing of the seismic survey data, estimates of subsurface rock velocities are routinely generated and near surface inhomogeneities are detected and displayed. In some cases, seismic data can be used to directly estimate rock porosity, water saturation, and hydrocarbon content. Less obviously, seismic waveform attributes such as phase, peak amplitude, peak-to-trough ratio, and a host of others, can often be empirically correlated with known hydrocarbon occurrences and that correlation applied to seismic data collected over new exploration targets.

Of course, the positioning of a drilling site is often critically dependent on the seismic data as interpreted by the explorationist, with the positioning largely determining the success or failure of the venture. An integral element of the process of seismic interpretation is the creation of a map that shows the lateral extent and depth (or time) of one or more target horizons. Although this map might be assembled in many ways, in a typical case the explorationist uses both printed and computer-displayed seismic records to trace the occurrence of specific seismic reflectors and/or seismic features throughout the survey, these reflectors and/or features being ones that are associated with a subsurface rock unit of interest. The general process of identification and selection of seismic events throughout a seismic section or volume is known as "picking" to those skilled in the arts.

Operationally, the explorationist usually begins the process of interpretation by locating the reflector of interest on seismic traces near a location where there is substantial confidence that it can be found and accurately characterized in the seismic data. For example, seismic traces that have been collected near an existing well are good candidates for use as a starting point, because the location of the target subsurface unit can often be verified via the use of synthetic seismograms that have been calculated from well logs that were taken in the well. In other cases, the explorationist might "tie" an unpicked seismic line with a picked seismic line that crosses it, etc. All of these methods are well known to those in the seismic interpretation arts.

However, the difficulty arises when the explorationist attempts to extend his or her interpretation away from those seismic traces wherein the time-location of the horizon of interest is known with some degree of certainty. Although the seismic reflector character might be known at a particular location, away from that location the reflection character is normally expected to vary due to, for example, changing rock unit thickness and composition. Further, the target reflector might not be laterally continuous throughout the survey region because of the presence of faults, pinch outs, truncations, etc. However, the explorationist will typically be charged with finding all of the occurrences of the reflector of interest wherever that unit occurs. Thus, the explorationist will need to laboriously examine the entire seismic data set in order to follow the reflector(s) of interest wherever they might go in time or space.

Of course, the explorationist/interpreter is not without tools to help him or her complete this undertaking. There is a bewildering array of automated picking algorithms which are designed to assist the user by selecting additional traces based on the explorationist's pick. These so-called "seeded" methods move from the "known" to the "unknown", in that they start from a "seed" or initial reflector pick from the interpreter, take that pick as correct, and then locate the chosen event on adjacent traces.

Predictably, where the reflection character changes seeded methods will often either jump to the wrong event or decide that the tracked reflector has ended. In either case, the interpreter will then need to determine the point at which the automated picking algorithm has gone astray and then provide another pick so that the algorithm can extend the corrected pick further onward. This sort of interaction between the explorationist and the software can be tedious and time consuming.

Heretofore, as is well known in the seismic processing and seismic interpretation arts, there has been a need for a method of improving the quality and efficiency of seismic event picking which does not require seeding by the interpreter. Accordingly, it should now be recognized, as was recognized by the present inventors, that there exists, and has existed for some time, a very real need for a method of seismic data processing that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

In accordance with the present invention, a method of seismic interpretation is disclosed hereinafter that is designed for use in improving the quality and speed with which an explorationist can pick and interpret a seismic volume. The instant invention is most suitable for application to seismic data after final migration and stack. It is further most preferably applied to 3-D data, although it could also be applied to grids of 2-D seismic data or even a single 2-D seismic line if that were desired.

In brief, the instant inventors have discovered a method of unseeded picking that operates on an entire seismic volume—or on a sub-volume specified by the user—to create a collection of patches or areas of similar-character reflector picks. The method is unsupervised initially and builds an output database that contains the time and amplitude of each "assigned" event, an assigned event being a seismic reflection that is determined to be similar in some sense to its neighboring traces. In principle, the database of events taken together represent a complete picking—but not an interpretation—of the seismic data.

As a next step, the interpreter accesses the seismic data from which the events database was compiled. The interpreter makes an initial pick of a reflector of interest, which pick is compared against the database of assigned events. If the picked event may be found within the database as an assigned event, all of the picks associated with that particular assigned event (the patch) are read and automatically posted on the interpreter's section or volume. The interpreter then moves to the outer limit of the newly-picked traces and picks another trace, which pick is again compared with the database and, if it corresponds to another assigned event, those picks are read and automatically posted on the section. In this manner, the user may quickly move through the seismic volume and produce a completely picked section in a minimal amount of time.

The foregoing has outlined in broad terms the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

FIG. 8 illustrates a specific window configuration, wherein two similar traces have been identified.

FIG. 9 contains a schematic illustration of the events database and its contents.

FIG. 10 illustrates schematically the sorts of information that are preferably stored in the event database.

DETAILED DESCRIPTION

Figure 1:
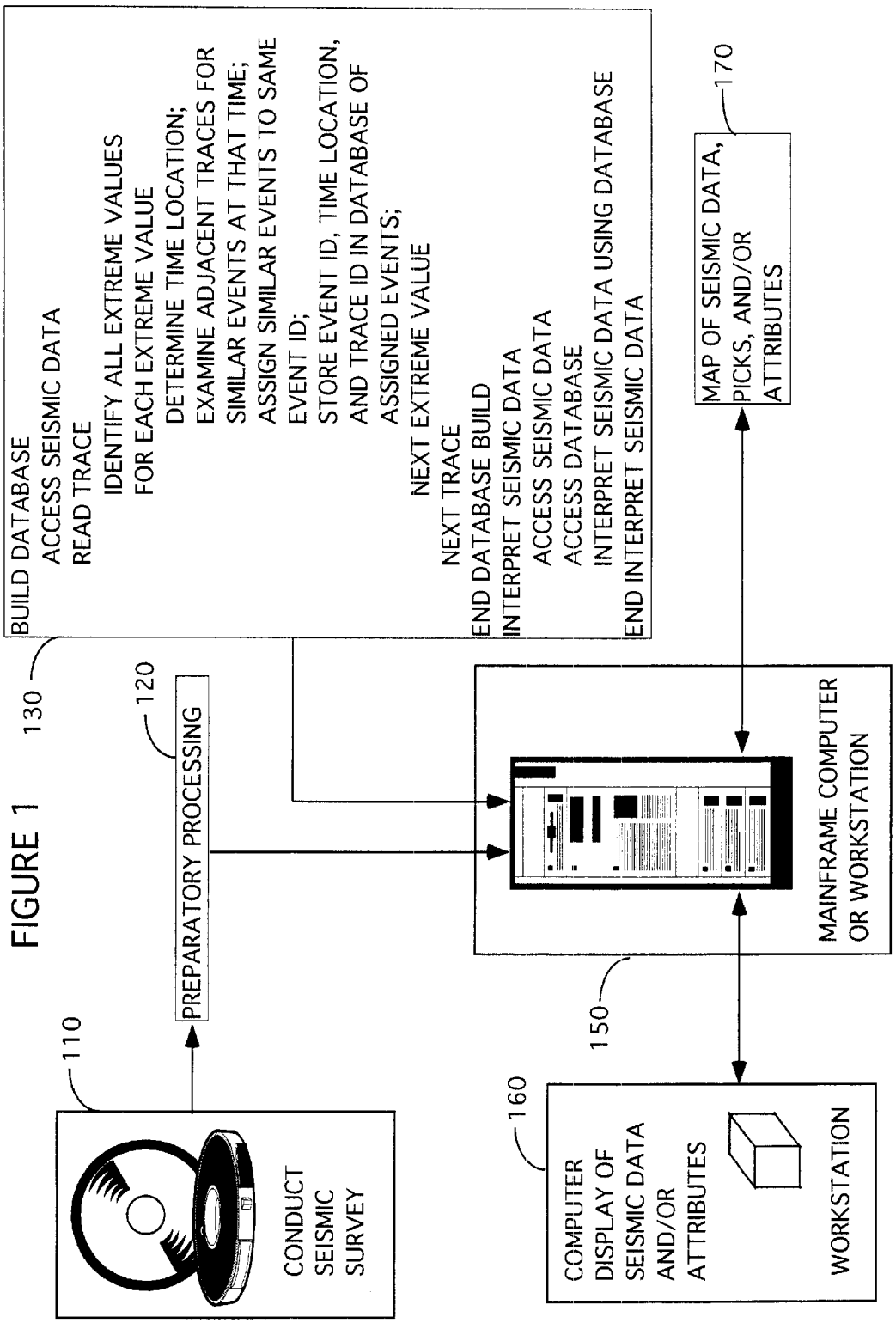
FIG. 1 illustrates generally the environment in which the invention disclosed herein would typically be used.

While this invention is susceptible of embodiment in many different forms, there is shown in the drawings, and will be described hereinafter in detail, some specific embodiments of the instant invention. It should be understood, however, that the present disclosure is to be considered an exemplification of the principles of the invention and is not intended to limit the invention to the specific embodiments or algorithms so described.

Environment of the Invention

FIG. 1 illustrates the general environment in which the instant invention would typically be utilized. In the conventional arrangement, seismic data 110 are collected in the field over a subsurface target of potential economic importance. The data might be collected over land, water, or any combination of these environments. In any case, it is always an object to collect the highest quality raw data (i.e., unprocessed seismic trace data) as is possible, as that can only make the subsequent job of processing and interpretation easier. Methods and procedures for acquiring seismic data in the field are well known to those of ordinary skill in the art. See, for example, *Applied Geophysics,* chapter 4.5, by Telford, Geldart, Sheriff, and Keys, 1978, Cambridge University Press, N.Y., and chapter 3 of *Seismic Exploration Fundamentals,* by J. A. Coffeen, 1978, Penwell Press, Tulsa, okla., the disclosures of both of which are incorporated herein by reference.

The collected seismic data 110 are typically next sent to a processing center where a variety of preparatory processes 120 are applied to the seismic traces to make them ready for use by the methods disclosed hereinafter. The processed traces would then be made available for use by the instant invention and might be stored, by way of example only, on hard disk, magnetic tape, magneto-optical disk, DVD disk, or other mass storage means.

The methods disclosed herein would best be implemented in the form of a computer program 130 that has been loaded onto a general purpose programmable computer 150 where it is accessible by a seismic interpreter or processor. A general purpose computer 150 includes, in addition to mainframes, workstations and personal computers, computers that provide for parallel and massively parallel computations, wherein the computational load is distributed between two or more processors.

A program 130 embodying the instant invention might be conveyed into the computer that is to execute it by means of, for example, a floppy disk, a magnetic disk, a magnetic tape, a magneto-optical disk, an optical disk, a CD-ROM, a DVD disk, a RAM card, flash RAM, a RAM card, a PROM chip, or loaded over a network.

Figure 2:
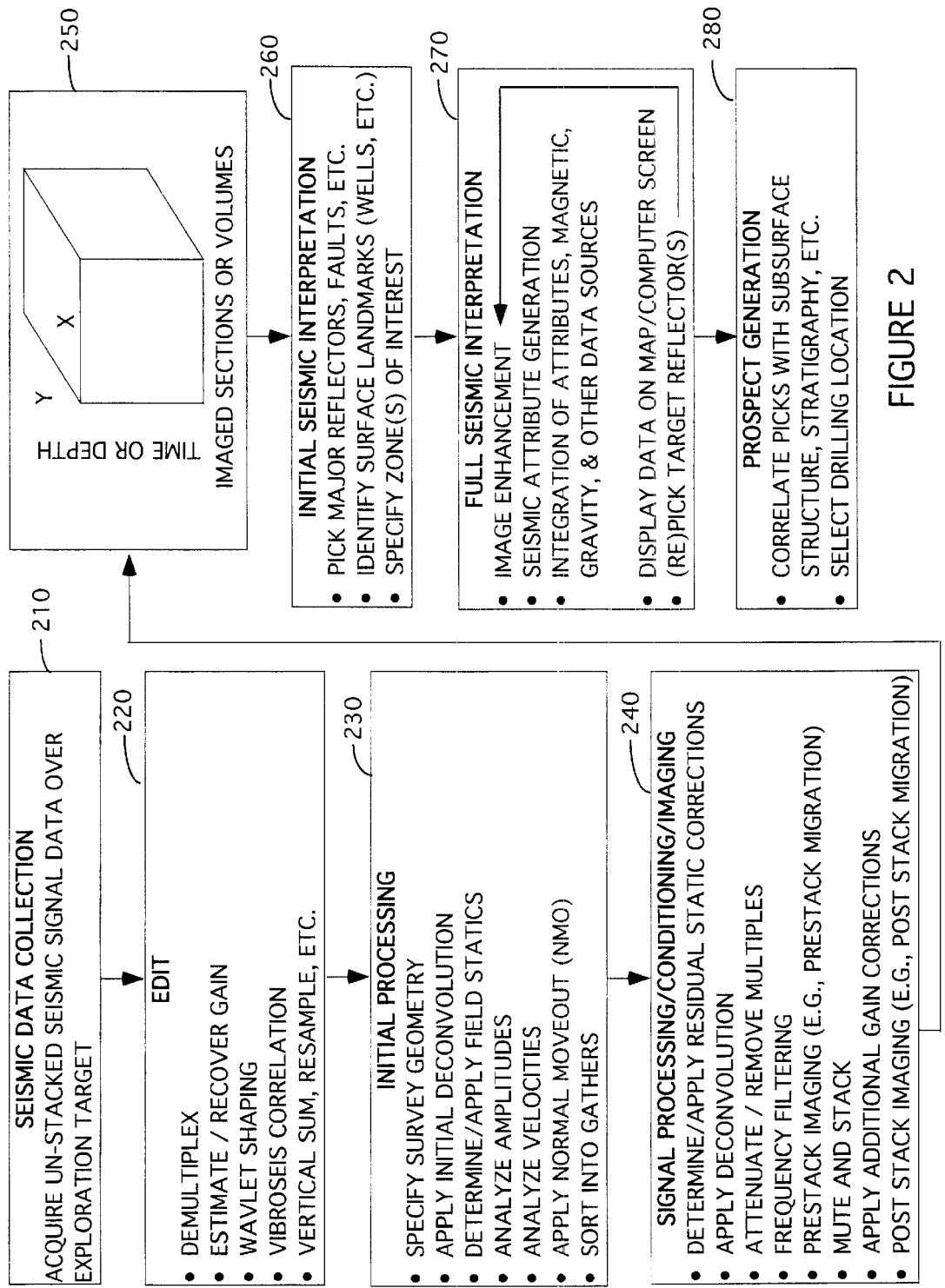
FIG. 2 illustrates some steps in a typical seismic processing sequence.

In a typical seismic processing environment, the steps listed in FIG. 2 will usually be performed by software algorithms that have been made part of a large package of modules that is designed to process seismic data from demultiplex through final stack and migration. The processed stacked seismic traces will typically be sorted into gathers, stacked, (step 240) and displayed either at a high resolution color computer monitor 160 (FIG. 1) or in hard-copy form as a printed seismic section or a map 170. The seismic interpreter will then use the displayed images to assist him or her in identifying subsurface features conducive to the generation, migration, or accumulation of hydrocarbons.

Seismic Processing

The data that are collected in the field consist of unstacked (i.e., unsummed) seismic records which contain digital information representative of the volume of the earth lying beneath the survey. Raw field data are not in a form that is most useful for exploration purposes and it is customary to subject the field traces to various processing algorithms of the general sort listed in FIG. 2 (steps 220 through 250) in preparation for its use by the explorationist (steps 260 through 280). Those skilled in the art will recognize that the processing steps illustrated in FIG. 2 are only broadly representative of the sorts of steps that seismic data would normally go through before it is interpreted: the choice and order of the processing steps, and the particular algorithms invoked, may vary markedly depending on the particular seismic processor, the signal source (dynamite, vibrator, etc.), the survey location (land, sea, etc.) of the data, and the company that processes the data.

As is generally illustrated in FIG. 2, preparing seismic data for use in interpretation is a complex process that involves a great many specialized algorithmic steps. Common early processing steps include basic trace editing 220 and specification of the geometry of the survey (step 230). As part of this step, each seismic trace is associated with both the physical receiver (or array) on the surface of the earth that recorded that particular trace and the shot (or generated seismic signal) that was recorded. The positional information pertaining to both the shot and receiver surface positions is then made a permanent part of the seismic trace "header," a general purpose storage area that conventionally accompanies each seismic trace. This shot-receiver location information is later used to determine the position of the "stacked" seismic traces. An NMO correction adjusts the time-location of each sample in the seismic trace according to its distance from that shot so that energy returning from the same reflectors are aligned at the same time on the seismic trace. This process is well known to those skilled in the art and will not be discussed further herein, although additional details are available in Yilmaz, cited previously, at pages 154–166, the disclosure of which is incorporated herein by reference.

After the initial pre-stack processing is completed, it is customary to condition the seismic signal on the unstacked seismic traces before creating stacked (or summed) data volumes (step 240). In FIG. 2, the "Signal Processing/Conditioning/Imaging" step 240 suggests a typical processing sequence, although those skilled in the art will recognize that many alternative processes could be used in place of the ones listed in the figure. In any case, the ultimate goal from the standpoint of the explorationist is the production of a stacked (and preferably migrated) seismic volume 250—or, in the case of 2D data, a stacked seismic line—for use in the exploration for hydrocarbons within the subsurface of the earth. Those skilled in the art will know that seismic data is conventionally "stacked" by first sorting it into "CMP" (i.e., common mid-point) or "CDP" (common depth point) gathers and then, for each such gather, summing together all of the digital seismic values at the same "time" level, thereby producing a single average or composite trace from the seismic traces in the gather. Note that the process of organizing the unstacked 3D traces into gathers is referred to as "binning", a term that is well known in the art.

As is suggested in FIG. 2, any digital sample within a stacked seismic volume is uniquely identified by an (X, Y, TIME) triplet: the X and Y coordinates representing some position on the surface of the earth, and the time coordinate measuring a recorded arrival time within the seismic trace (step 250). For purposes of specificity, it will be assumed that the X direction corresponds to the "in-line" direction, and the Y measurement corresponds to the "cross-line" direction, as the terms "in-line" and "cross-line" are generally understood to mean in the art. Although time is the preferred and most common vertical axis unit, those skilled in the art understand that other units are certainly possible might include, for example, depth or frequency. Additionally, it is well known to those skilled in the art that it is possible to convert seismic traces from one axis unit (e.g., time) to another (e.g., depth) using standard mathematical conversion techniques. That being said, the discussion that follows will be framed largely in terms of "time" as a vertical axis measure, but that choice was made for purposes of specificity only, rather than out of any intention to so limit the methods disclosed herein. Thus, when "time" is used hereinafter as a descriptor to refer to the vertical axis of a seismic trace, it should be understood and remembered that "time" is to be broadly construed to also include any other applicable vertical axis, including depth or frequency, that provides an index into the samples of a seismic trace.

Another important use for seismic data is as a source for seismic attributes (step 270). As is well known to those skilled in the art, seismic attributes are values that are calculated from seismic data and that serve to highlight some specific property or feature of the data that might not otherwise be apparent. Although FIG. 2 seems to indicate that seismic attribute generation 270 takes place relatively late in the processing sequence, that is not always the case and attributes might potentially be calculated and analyzed at almost any stage of the processing.

The explorationist may do an initial interpretation 260 of the resulting processed data (which will typically be a migrated seismic volume), wherein he or she locates and identifies the principal reflectors and faults wherever they occur in the data set. This is usually followed by a more detailed interpretation, which would include additional image enhancement, generation and analysis of seismic attributes, and integration of non-seismic sources (e.g., well logs, satellite surveys, magnetic surveys, gravity surveys, etc.) into the interpretation (step 270). Of course, after the data from these disparate sources have been fully integrated the explorationist may become convinced that the initial interpretation was flawed (or inconsistent with the new information) and, in which case, a new interpretation may be called for, which may necessitate additional image enhancement, etc. Needless to say, the process of interpretation/reformulation may be repeated as necessary until the interpreter has fully integrated data from all sources and is ready to move to the prospect generation stage (step 280).

Finally, as noted in FIG. 2, the explorationist will use the processed seismic data to correlate the processed seismic data with subsurface structural or stratigraphic features conducive to the generation, accumulation, or migration of hydrocarbons (i.e., prospect generation 280). Based on this information, a well location will be selected and drilled.

Preferred Embodiments

Figure 3A:
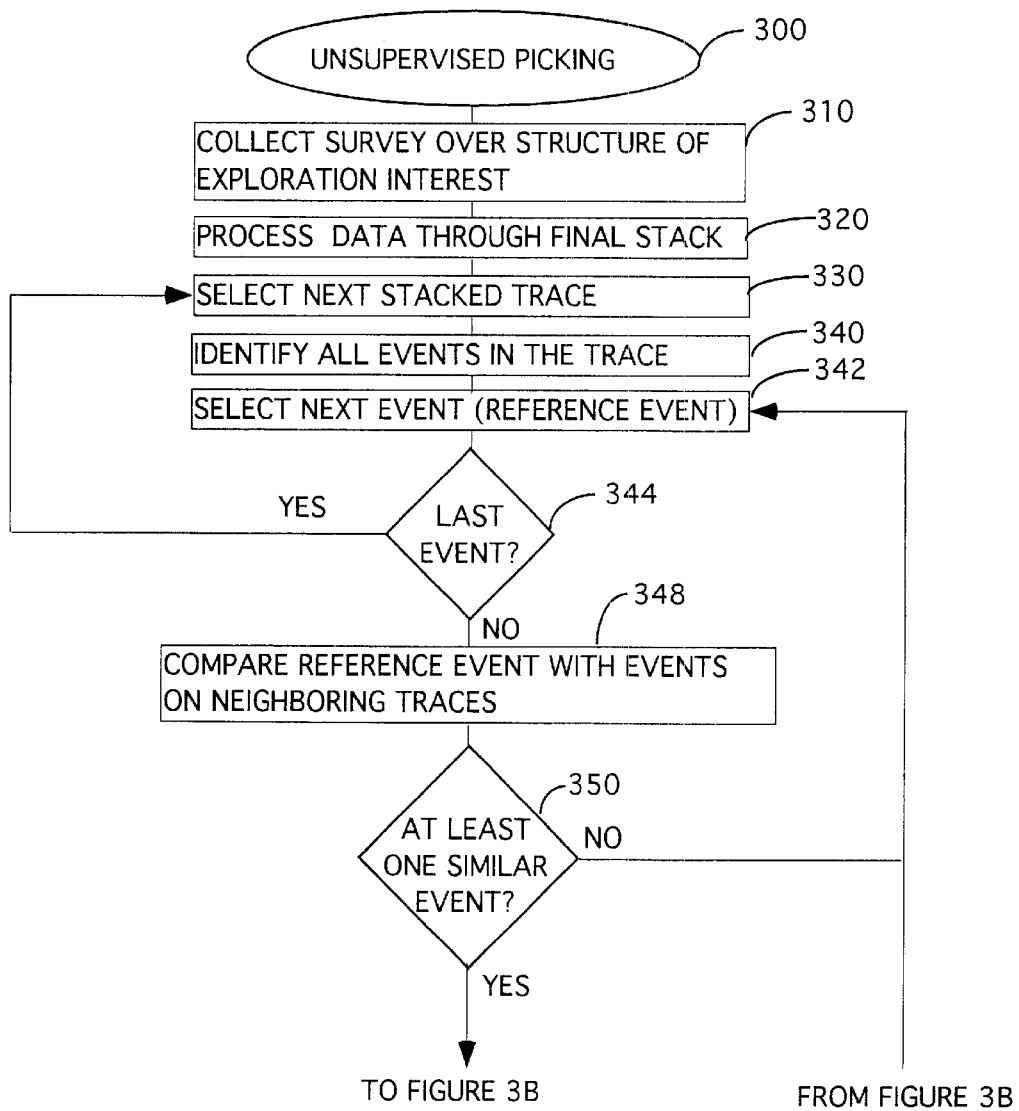
FIGS. 3A and 3B contain a flowchart that illustrates the principal steps in the unsupervised picking embodiment of the instant invention.
Figure 3B:
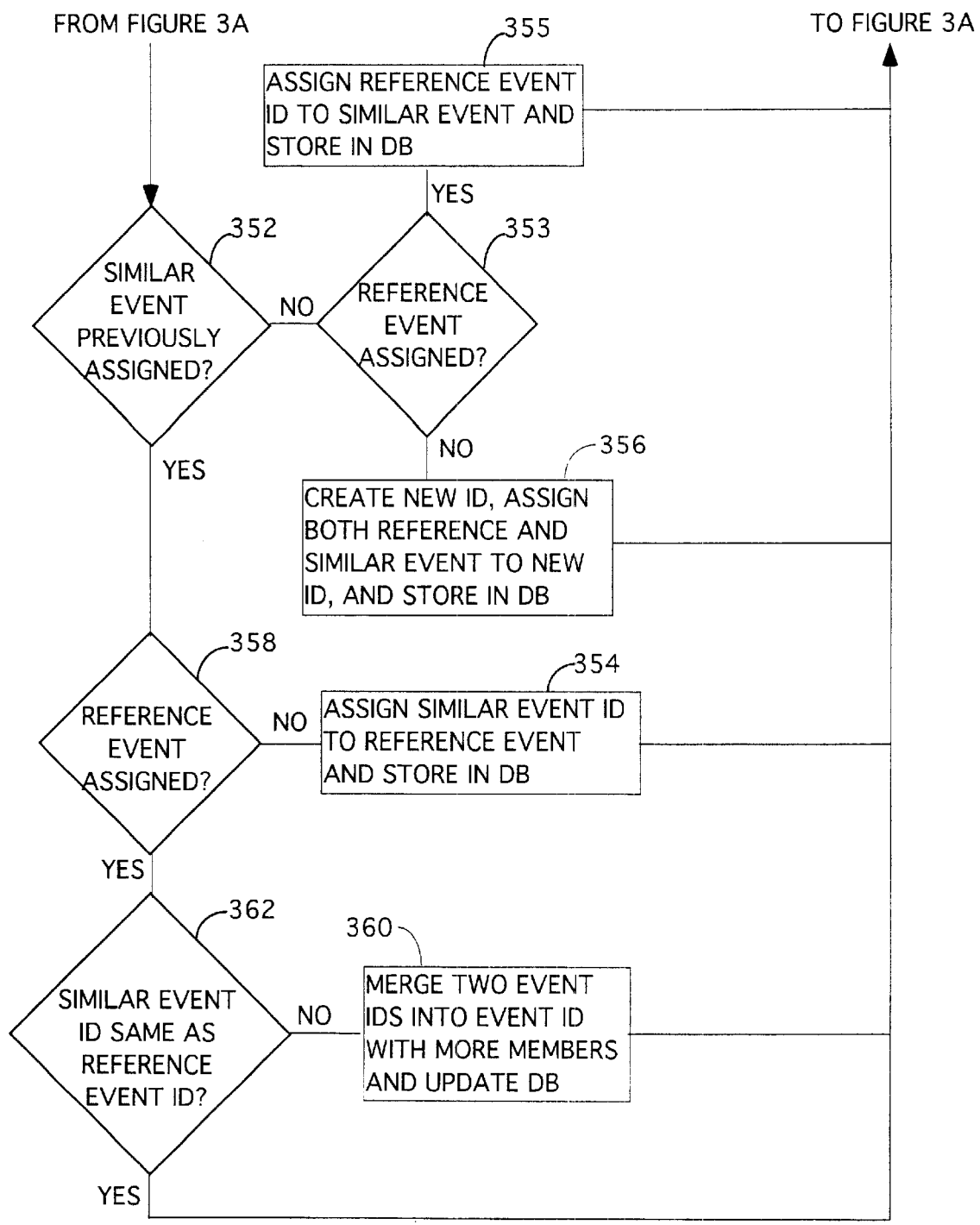

As is generally illustrated in FIGS. 3A and 3B, the instant invention preferably begins with a stacked seismic volume which is suitable for interpretation by an explorationist (step 320). That being said, it should be noted that it might be necessary or desirable to interpret unstacked seismic traces (e.g., for purposes of extracting and/or mapping AVO information). Thus, for purposes of the instant disclosure it should be understood that the terms, "trace", "seismic trace" are to be interpreted in their broadest sense to include unstacked seismic traces if that would be appropriate. However, for purposes of specificity in the text that follows, the discussion will generally be framed in terms of stacked seismic traces. Additionally, although the instant invention is most suitable for use with 3-D seismic volumes, it should be remembered that it could also be applied to grids of 2-D seismic lines, individual 2-D seismic lines, individual shot records, and 2-D lines extracted from 3-D volumes. That being said, the instant invention will typically be used with a stacked 3-D seismic volume.

As a next step 330, a first trace will be selected from the processed seismic line or volume. The selected trace will be examined to identify all of the "events" in that trace, preferably according to the method described below (step 340). For purposes of the instant preferred embodiment, an "event" will be defined to be a peak in a seismic waveform, wherein the term "peak" is used in its conventional sense to refer to a positive amplitude seismic event. Additionally, the instant inventors contemplate that the user might wish to restrict the calculation of "events" to only a portion of the seismic volume, rather than having the full length of each trace be examined. It is thus customary to specify a zone of interest or other bounded time interval that represents the maximum and minimum time interval over which the user has an interest and within which the program should operate. Finally, the instant invention would work equally well if the "event" were defined to be a seismic trough (or negative value) rather than a peak. Those of ordinary skill in the art will understand how to adapt the method disclosed herein to the use of troughs instead of peaks. Thus, in the text that follows the term "peak" is used for purposes of specificity only and it should be understood to apply to any extreme value—whether a trough or a peak.

Figure 5:
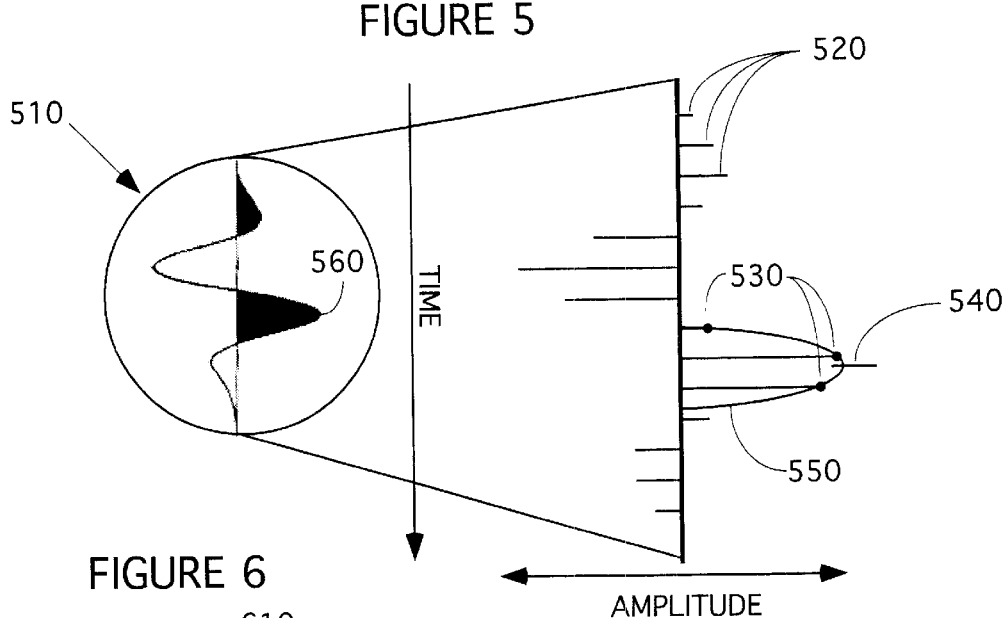
FIG. 5 contains schematic drawing that illustrates how the preferred peak finding algorithm operates.

FIG. 5 contains a portion of a seismic trace 510 which will be used to illustrate the preferred method of identifying seismic events. Note that, as is conventional in the industry, the positive portions of the trace 510 have been black-filled, whereas the negative lobes are left unfilled. Further, although the seismic waveform 510 appears to be a continuous curve, those of ordinary skill in the art will recognize that such waveforms are composed of many closely spaced digital samples which give the appearance of continuity when they are plotted at usual time resolutions. The right hand side of FIG. 5 contains a schematic representation of the digital samples 520 that compose the waveform on the left.

For purposes of the instant invention, peak 560 is an "event" that would be suitable for use with the steps that follow. In the preferred embodiment, this peak 560 can be identified from its digital representation by noting that near its apex there are three digital samples 530 that have the following amplitude relationships:

$$x_n > x_{n-1},$$

and, $$X_n \geq X_{n-1},$$

with $$X_n > 0,$$

where $x_n$ is the amplitude of the seismic trace at sample "n". In short, a seismic peak may be identified for purposes of the instant preferred embodiment by finding a digital sample value that is surrounded by two other samples that are equal to or smaller than it. Of course, this is just the preferred method of identifying events and those of ordinary skill in the art will recognize that there are many methods of locating seismic peaks, most of which are much more complex than the method utilized herein. However, the instant method has proven to be suitable for most purposes and has the advantage of being extremely fast to compute.

For purposes of the steps that follow, it is often advantageous to eliminate from further consideration some of the events/peaks that have been identified at the previous step. That is, those skilled in the art will recognize that not every peak in a seismic trace is of any exploration interest, and this is especially true near the top of the section where the data are low fold and noise is more prominent than signal. Additionally, multiples, side swipe, diffractions, ground roll, etc., can introduce reflectors into a section that are artifacts and that are not related to the geology of interest. As a consequence, it is preferred that certain categories of reflectors be eliminated from further consideration early in the process. For example, the instant inventors have determined that better results are generally obtained if peaks that are smaller than some fixed percentage of the maximum amplitude on the trace, say 25% of the maximum, be dropped from further consideration. Additionally, screening criteria based on peak width, frequency content, phase, or any other calculable value might alternatively be used.

A further preferred step in the instant method is to refine the time-location of the identified event by fitting a quadratic curve through the three points 530 that define the peak and choosing as the location of the peak the actual apex 540 of the fitted polynomial. By way of explanation, the middle sample 530 can certainly be used to define the time-location of the event 560 and that is often done. However, the instant inventors prefer that the apex of the event be identified more precisely by attempting to estimate where it actually falls between the digital samples. As is broadly illustrated by the example on the right in FIG. 5, when quadratic equation 550 is fit to the peak-defining points 530, the apex 540 is seen to lie between the middle and lower digital sample. Given the coefficients of the fitted equation, the exact time-location of the apex can readily be determined from the quadratic equation or by other means. Those skilled in the art will recognize that this is only one of many possible peak locating methods and the exact method that is utilized is not important for purposes of the instant invention.

Given the time associated with the apex of the peak, the amplitude of that peak is next preferably extracted. Of course, determining the amplitude of the event is a simple matter if the peak has been taken to be the middle sample of the three defining points 530. If the peak location is determined from an equation, the amplitude of the peak will just be the value of the fitted curve evaluated at its maximum. In either case, it is preferable that the amplitude be extracted for mapping and/or quality control purposes, although that operation is not strictly required as a step in the instant method.

Next, the trace location (e.g., the CMP number, bin number, surface coordinates, latitude and longitude, in-line and cross-line trace numbers, etc.) will preferably be extracted from the current trace. This information is useful in many contexts including map making for seismic attribute analysis, quality control, etc. However, it is especially useful in the next step.

Figure 6:
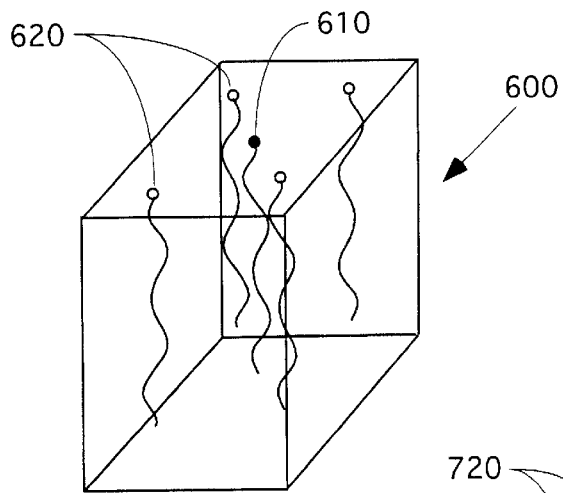
FIG. 6 illustrates a target trace and traces from the neighborhood surrounding it.
Figure 7:
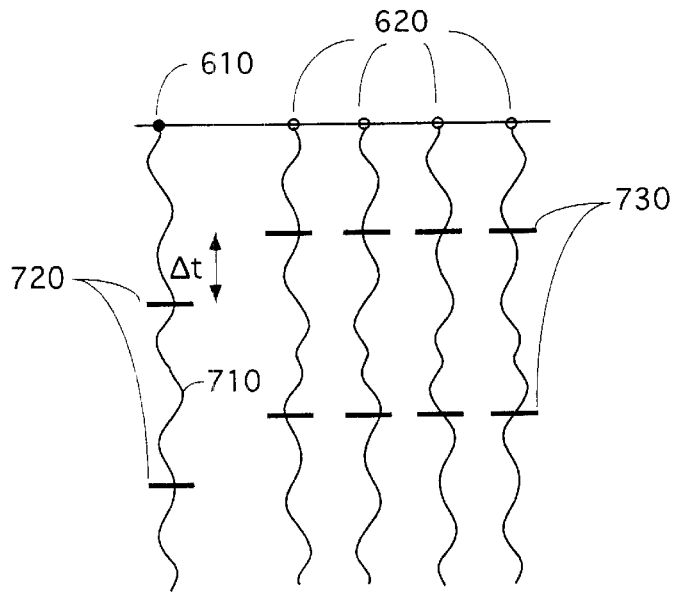
FIG. 7 illustrates how assigned events are identified on adjacent traces.

As a next preferred step, the character of the newly-located seismic event will be compared with the character of other events that can be found on the traces that surround it (step 348). As is generally illustrated in FIGS. 6 and 7, given the surface location of the trace 610 that has been selected for analysis, it is generally possible to identify and read the seismic traces that are neighbors 620 thereof. The exact number of neighbors that are utilized in this step—and the size and shape of the neighborhood that determines which traces will be included—is not important, but in the preferred embodiment four neighboring traces will be used: the nearest two in-line traces and the nearest two cross-line traces when the seismic survey is a 3-D survey. Obviously, many variations of this arrangement are possible and have been specifically contemplated by the instant inventors including rectangular and circular neighborhoods, etc.

Given a collection of neighboring traces, the instant invention next proceeds to determine for each identified event whether there is a similar event on a neighboring trace (step 348). This determination is preferably made as follows. As is generally illustrated in FIG. 7, a temporal window 720 (the "reference window", hereinafter) is constructed about identified event 710, preferably this window will be about 24 ms in duration, will be centered on the identified event 710, and will be of sufficient duration to encompass substantially all of the event whose peak has been selected. Next, the first of a series of overlapping windows of similar length 730 is identified on each of the neighboring traces 620. Preferably, the starting window 730 will be offset by some amount in time $\Delta t$ from the reference window 720, where $\Delta t$ is about 8 ms, with subsequent windows being separated by about 2 ms or 4 ms. Preferably, the ending window will be offset by about −8 ms so that a total of about 9 different windows/window positions will be considered. That being said, those of ordinary skill in the art will recognize that the choice of $\Delta t$, the amount of overlap, and the window increment are design decisions that will ultimately need to be made in view of the particular data under analysis and values substantially different from the preferred values might be optimal for some sorts of seismic data.

Now, for each window on each trace a measure of similarity between the data in that window and the reference window 720 will be calculated. In the preferred embodiment the measure of similarity that is used is the so-called "RB" factor which is discussed in greater detail in U.S. Pat. Nos. 5,853,883, 5,835,882, and 5,706,194, (the disclosures of which are specifically incorporated herein by reference) and various other patents related thereto. Those skilled in the art will know that the RB factor is a weighted linear combination of a conventional correlation coefficient and a normalized sample difference. These two similarity measures (or similarity coefficients) are preferably calculated as follows. Let, $r_i$ represent digital seismic values within the reference window 720 and let $x_i$ represent the data values from one of the neighborhood traces within a comparison window. For purposes of simplicity assume that there are "N" samples within the window and that both $r_i$ and $x_i$ are uniquely defined within the selected window by values of "i" between 1 and N. Then if $X(r,x)$ is the correlation coefficient between the digital values in the reference and comparison windows:

$$X(r, x) = \frac{\sum_{i=1}^{N} r_i x_i}{\sum_{i=1}^{N} r_i^2 * \sum_{i=1}^{N} x_i^2},$$

and, if D(r,x) is the normalized sample difference between the two windows $$D(r, x) = \frac{\sum_{i=1}^{N} (|r_i| + |x_i|) - \sum_{i=1}^{N} |r_i - x_i|}{\sum_{i=1}^{N} (|r_i| + |x_i|)},$$

then the RB-factor is defined as a weighted average of these two measures according to the following equation:

$$RB(r,x) = wX(r,x) + (1-w)D(r,x),$$

where w is a weighting factor that potentially varies between 0 and 1. In most cases, w will be chosen to be equal to 0.5, which produces an equal weighting of the two similarity measures.

Note that the RB factor can potentially vary between −1.0 (perfect negative correlation) and +1.0 (perfect positive correlation). However, for purposes of the instant invention only RB values that are above some predetermined positive threshold (0.9 is typically used by the instant inventors) will be utilized at the next step. In other words, only those traces with events having a similarity numerically greater than or equal to 0.9 will be considered as being "similar" for purposes of event assignment discussed hereinafter.

Note also that, although the preferred embodiment employs the RB factor as a measure of similarity between the seismic trace windows, there are any number of other similarity measures that might be used instead. The particular similarity coefficient that is used is not a critical aspect of the instant invention and those skilled in the art will recognize that there are many alternative measures (and combinations of measures) that could be used in the alternative.

Finally, it is preferred that the previous comparison be performed using a plurality of different sliding windows each offset by a different time amount. This is conventionally in the industry done to allow for the possibility that there is dip in the reflectors on this section. Thus, it is anticipated that each neighborhood trace 620 will be examined at a variety of window positions 730. In the preferred embodiment, sliding windows will be computed over a Δt range of about ±8 ms.

The purpose of the previous operation was to determine whether there are any waveforms on any of the adjacent/neighbor traces 620 that have characteristics that are similar to those of the currently selected event (step 348). In the event that none of the sliding windows as applied to each of the neighborhood traces prove to be similar as measured by the predetermined criteria (step 350) this event will preferably not be considered further and, more importantly, will not be entered into the database discussed infra. The method will then continue with the selection of a next reference event (steps 350 and 342).

However, in the event that there is a similar waveform on a neighboring trace, the instant method now preferably differs depending on whether one of the similar events has previously been "assigned" (step 352). By way of explanation, for purposes of the instant disclosure an event will be said to be assigned if it has been given an event ID number and stored in the events database.

Assume for purposes of illustration that event 820 in FIG. 8 has previously been assigned ID # K (step 352, left branch). If it is determined that reference event 710 is similar to event 820, event 710 will also assigned ID # K, and the trace number of trace 610, as well as the event time and amplitude, are preferably stored in the events database (step 354 and generally FIG. 10). Thus, previously unassigned event 710 is now an assigned event for purposes of subsequent computations.

On the other hand, if it is the reference event 710 that has previously been assigned an identification number and the comparison event 820 is unassigned, the comparison event 820 will be given the ID number of the reference event 710 if the two events are judged to be similar (steps 353 and 355, FIG. 3B). Information relating to event 820—e.g., trace number, event time, amplitude, etc., —will be stored in the event database for subsequent use during seismic interpretation (step 355 and FIG. 10).

If neither 820 nor 710 have been previously assigned, a new event ID is created and assigned to both events (step 356).

Finally, if both events 820 and 710 are already assigned (step 362) the method differs depending whether the assigned ID numbers are the same or different. If they are they same, no further action need be taken (step 362) and the method continues to the next event (step 342). However, if the event ID numbers differ, the corresponding database events are preferably combined into a single event ID. The preferred method of combining these two groups is by reassigning the event ID with the fewer number of traces to be the same as the ID of the larger event in the database (steps 362 and 360). Said another way, the smaller group is effectively merged into the larger. This means that the event with smaller surface area coverage will tend to be made a part of the event that covers a larger area.

In the same way, all of the events on the target trace 610 within the zone of interest will successively be identified and processed, with each event being assigned to an existing event ID, acting as the first instance of a new ID, or being ignored, depending on the similarity between the target event and its neighbors within the analysis window.

Similarly, each trace in the data set will be successively read and processed according to the steps of FIG. 3 (steps 330 through 356) until all of the traces have been processed. The net effect of the previous operations is that reflectors throughout the seismic data set will have been organized into similar-character classes. It is important to note that this classification has been undirected. That is, the instant method is fully automatic (aside from the optional specification of various program parameters) and produces an organization without human direction.

FIG. 10 contains a representative tabular array that illustrates the sort of information that would preferably be included as part of an events database. For each event in the database, there will be an ID number as well as the time at which the event was found on the seismic trace. Additionally, some sort of unique trace identifier will be stored as part of each event record (e.g., the in-line and cross-line trace numbers in the example of FIG. 10) as well as the amplitude of the event, preferably having been determined as was discussed previously. Finally, those of ordinary skill in the art will understand that the term "database" should be used in its broadest sense to include any collection of related information, whether contained in a single file or multiple files. This usage of database would encompass, by way of example, flat, hierarchical, and relational databases and any variants thereof.

FIG. 9 illustrates in a general way the sort of information that might be stored in the events database 900 and how that information relates to the original seismic data set from which it was calculated. Conceptually, the database 900 may be thought of as being arranged in the same spatial configuration as the seismic data from which it was calculated, which, for purposes of illustration, will be assumed to be a 3-D seismic volume. Each point in the database 900 represents an event that was located in the original seismic data. Each such event will preferably have stored with it a trace number or other surface location (e.g., latitude/longitude, in-line/cross-line trace number, etc.) as well as an event ID (if one has been assigned) and the peak amplitude of the seismic waveform that gave rise to the event.

If a time slice or other plane is extracted from the database, it would be expected to have the general appearance of the plan-view illustration on the right hand side of FIG. 9. That is, at a given time level in the section there will generally be a number of different identified events, which events are assigned to ID numbers 910 through 950 in this example. In this figure, the separately numbered regions each indicate the lateral extent of reflectors that have been determined to be similar in character by methods discussed previously. As should be clear in this example, the event 930 is the predominant event at this time level, at least in terms of spatial extent. Further, it should be noted that it may very well be that all of these separately categorized events—910 through 950—actually correspond to a single reflector of interest. However, the joining together of these different regions will be left to the discretion of the interpreter as is described hereinafter.

It should also be noted in FIG. 9 that not every trace has an assigned event at this time slice. For example, region 960 represents those traces that are unassigned, i.e., that are not similar to any of their neighbors. That being said, it is preferable that unassigned events be completely excluded from the database and those events have been included in the example of FIG. 9 only for purposes of illustration. Finally, those skilled in the art will recognize that FIG. 9 is at least somewhat unrealistic in that it would be unusual to find reflectors that are almost perfectly flat over an entire survey region (e.g., event ID 930). More typically, dipping reflectors would be seen "cutting across" any constant-time slice that was extracted for display.

Figure 4:
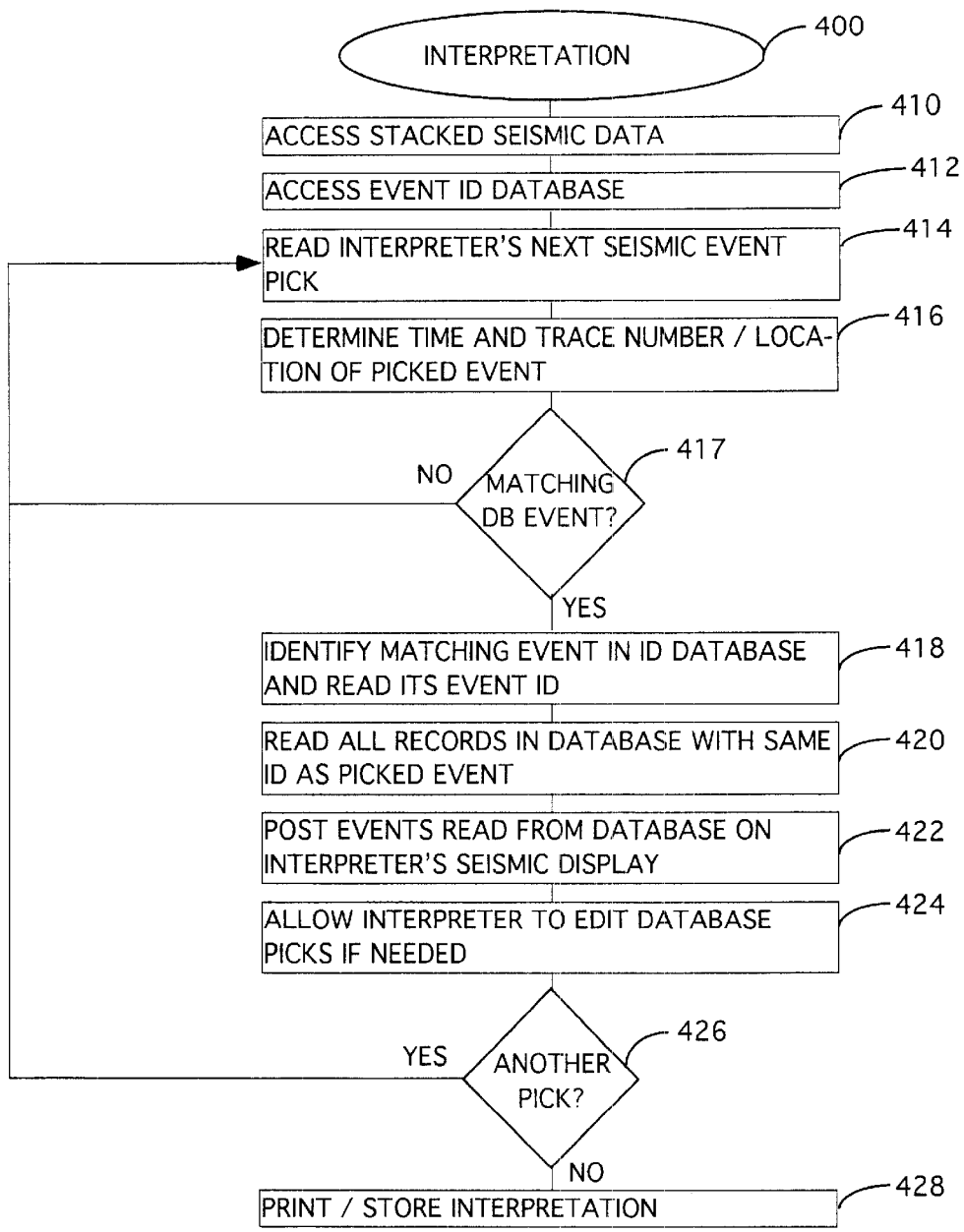
FIG. 4 contains a flowchart that illustrates the principle steps in the interpretation phase of the instant invention.

Given the information stored in the event ID database the explorationist utilizes that information in forming an interpretation as is generally illustrated in FIG. 4. Those skilled in the art will know that the explorationist usually constructs his or her interpretation at a computer workstation 160 (FIG. 1) that has been fitted with a high resolution terminal and specialized software that assists in that effort. The workstation 160 will be given access to the events database as well as the processed seismic data from which the database was built (steps 410 and 412). Then, as a next step, the interpreter will place a first pick on the seismic section (step 414). Those of ordinary skill in the art will recognize that a user typically "picks" seismic data by visually identifying a reflector of interest within the seismic section or volume and then memorializing that identification by "clicking" with the mouse pointer on the computer screen at the point in time (or depth) where the event is displayed. The workstation software then reads the pick from the user and determines the time and trace number that was picked (steps 414 and 416).

According to a next preferred step, the instant method continues by comparing the time and trace number/trace location (step 416) of the user-picked trace with the entries in the events database to attempt to find a matching event. If there is no matching assigned event (step 417), the user's pick is preferably rejected and a message is provided to the user that no such event could be located in the database. The user will then be allowed to make another pick (step 414). Optionally, the user could be offered picks that do not correspond exactly to the actual pick, but be within some predetermined time (or trace) interval of the pick (e.g., within ±10 ms and/or ±5 traces). For example, if the user has picked an event at 1300 ms and that trace has an event in the database at 1320 ms, in some cases the 1320 ms event might be offered to the user. In other cases, the user might insist on exact event matching. Obviously, either method could easily be implemented in software as part of the instant method.

However, in the more typical scenario there will be an event within the events database that at least approximately matches the time and trace number of the picked event (step 417). In that case, the event ID is determined for the matching database event (step 418) and all of the events having the same ID (step 418) are read from the events database (step 420) and automatically posted for the explorationist on the seismic section or volume (step 422).

Mention should be made at this point of the importance of the last step in the previous paragraph. By making a single pick the explorationist has potentially extended his or her picked region to thousands of traces. This is in contrast to the prior art which, at its worst, required separate picking of each trace in the survey. Further, the new picks that have been posted are guaranteed to be mathematically similar to each other by virtue of the way the events were originally selected and assigned. Still further, these events have been selected without reference to any preconceived notions from the explorationist about where the picked reflector "should" go. Finally, the database picks are "quality picks" in that the use of the similarity measure will limit the extension of a same-ID region to only those traces that are actually "similar": no attempt will be made to "force" the reflector into regions where there is any doubt that it could be found. Thus, the additional picks from the database should require very little editing (step 424, discussed below) and will likely be incorporated into the final interpretation.

As a next preferred step, the interpreter will be offered an opportunity to review and accept (or reject) the automatically generated picks (step 424). As with any automatic picking method, there will be many picks that are appropriate and possibly a few that are not. In a typical arrangement, the automated picks obtained by the instant method will be plotted "on top" of the displayed seismic data and displayed at the workstation for review by the explorationist, whereafter those picks that are not consistent with the interpretation can be removed. Additionally, it is preferred that the picks also be displayed in a map view as a color-filled structure contour map to show the lateral extent of the event and its time-structure. As is well known to those of ordinary skill in the art, a map of the event amplitude is commonly displayed also to gain further information and insight as to the significance of the event.

As a next step, the interpreter will move to the periphery of the picked region—beyond that point where the automated picks have been added—and pick again (steps 426 and 414). Once again, the new pick will be compared with the assigned events in the database and all of those events that correspond to this new pick will be added to the interpretation (steps 416 through 422). Again, the explorationist's interpretation will likely have been extended by a substantial amount by virtue of the inclusion of the automated picks.

In summary, by utilizing the unseeded picks of the instant invention, the explorationist can quickly and efficiently interpret large volumes of seismic data, with substantial numbers of picks being added to the interpretation by a single manual pick. In most cases, single picks by the explorationist will result in the inclusion of large numbers of pre-selected picks so that the explorationist can quickly move through the dataset and complete his or her interpretation.

Additional Embodiments

Note that many variations of the method discussed previously are possible and have been specifically contemplated by the instant inventors. For example, according to another preferred aspect of the instant invention there is provided an invention substantially similar to that described previously, but wherein the event information that is calculated from the seismic data and stored within the database is used for purposes of constructing seismic attribute maps for use in exploration. For example, the database of FIG. 10 contains sufficient surface location information to make it possible to construct maps of subsurface reflector amplitude. Such maps are routinely used by explorationists as tools to assist in the determination of subsurface structure and/or stratigraphy. It is well known that maps such as these might be printed on paper 170 or displayed at a seismic workstation 160, either of which sorts of display could be appropriate depending on the desires of the explorationist.

In another preferred embodiment, the instant inventors eliminate from the database any event ID that does not cover some specific proportion of the seismic section or volume. That is, if an event ID only has a very few traces associated with it, it is likely that the event is spurious. Thus, the instant inventors prefer to eliminate any event ID that covers less than, say, 2% of the survey area as being too small to be significant.

In still another embodiment, the instant inventors contemplate that it might be desirable in some circumstances to use seismic "events" that are broader than just a single peak. Those skilled in the art will understand that oftentimes it is not just a single peak that characterizes a given subsurface rock unit, but rather a series of peaks and troughs. Such complex seismic reflection events would be suitable for use with the instant invention provided that they can be defined with sufficient specificity to allow their identification on the seismic trace. As a specific example, an "event" could be defined to be two peaks separated by a trough, each of said peaks being at least 25% larger than the absolute value of the trough amplitude, wherein the recorded "pick" corresponds to the peak earliest in time. Alternatively, both peak locations (or the peaks and trough times) could be recorded in the database for later use. Clearly, many variations of this approach are possible. Additionally, it should be noted that the preferred similarity coefficient—indeed, all such similarity coefficients—does not depend on any particular definition of "event": it is broadly applicable to any sort of seismic data window. Thus, when the term "event" is used herein, it should be understood to mean any combination of peaks and troughs that yields a unique picked time value that can be compared with an interpreter's picks.

Still further, although the instant unseeded picking algorithm is designed to start at the periphery of a seismic dataset and move in toward its interior, the instant inventors contemplate that in some circumstances it might be desirable to start the instant method in the middle of the section, start it at multiple locations, and/or multiple random locations. This might be done for many reasons, but one of the more compelling is that the fold (and, hence, signal strength) at the periphery of a seismic survey tends to be lower than the fold near the middle, which suggests that the results might be superior in some instances if the instant method begins with better data. That being said, those of ordinary skill in the art will realize the particular starting point within the section or volume is not a critical aspect of the instant invention.

Even further, the instant inventors prefer that, prior to application of the unseeded picking method to a seismic data set, it previously have been interpreted at least to the extent of locating the major subsurface faults. Although this is not strictly required for the successful operation of the instant method, if the similarity calculation is restricted by not allowing neighboring traces to be selected from opposite sides of a fault, the quality of the resulting collection of event IDs is likely to be improved.

Finally, in another preferred embodiment the instant inventors contemplate that in some circumstances certain assignments that otherwise would meet the selected similarity threshold should be rejected as being inconsistent with the surrounding picks. For example, since it is generally the case that most seismic reflectors are at least approximately planar when examined over the span of only a few traces, a pick that deviate "substantially" from the plane defined by its surrounding picks is suspect. Thus, in a preferred embodiment a "planar deviation" test is performed before assigning an event ID to a new pick. Then, if the new event does not at least approximately lie on the 3-D plane defined by its neighbors, it is recharacterized as "unassigned." Although this test might be performed in many different ways, in the preferred embodiment a "quick and dirty" test is utilized which requires a minimal computer resources to implement. Preferably, the test for coplanar data points begins by subtracting the time-location of the candidate event from the time locations of the neighboring/assigned events. These differences are then summed and the magnitude of the sum noted. In terms of equations, the test value "T" can be written as follows:

$$T = \sum_{i=1}^{n} (t_c - t_i),$$

where $t_c$ is the time location of the candidate event (in ms) and $t_i$ is the time location of the "n" neighboring events.

If the absolute value of the summed difference T is smaller than a predetermined value (e.g., 1 ms), the candidate event is given the event ID of its neighboring events. On the other hand, if the sum is larger than the predetermined value that fact suggests that the candidate event does not lie on the plane that includes its neighbors. Those skilled in the art will recognize that the previous preferred test for co-planar points is based on the general observation that where four or more co-planer points are symmetrically arrayed about a center point, the sum of differences in their "y" values will be zero. To the extent that these points are not co-planar, the calculated difference will be different from zero. Additionally, it is certainly possible that a conventional statistical test that identifies coplanar observations could be used and such tests are well known to those of ordinary skill in the art. However, those tests would require additional computer resources to calculate.

CONCLUSIONS

In the previous discussion the language has been expressed in terms of operations performed on conventional seismic data. But, it is understood by those skilled in the art that the invention herein described could be applied advantageously in other subject matter areas, and used to locate other subsurface minerals besides hydrocarbons, e.g., coal. By way of additional examples, the same approach described herein could be used to process and/or analyze multi-component seismic data, shear wave data, magneto-telluric data, cross well survey data, full waveform sonic logs, or model-based digital simulations of any of the foregoing. Additionally, the methods claimed herein after can be applied to mathematically transformed versions of these same data traces including, for example: frequency domain Fourier transformed data; transformations by discrete orthonormal transforms; instantaneous phase, instantaneous frequency, analytic traces, and quadrature traces; etc. In short, the process disclosed herein can potentially be applied to any collection of geophysical time series, and mathematical transformations of same, but it is preferably applied to a collection of spatially related time series containing structural and stratigraphic features. Thus, in the text that follows those skilled in the art will understand that "seismic trace" is used herein in a generic sense to apply to geophysical time series in general.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

References

The documents and texts that are listed below are specifically incorporated by reference into this patent application in their entireties:

Aki, K. and P. Richards, 1980, *Quantitative Seismology*, Freeman Press, N.Y.

Coffeen, J. A., *Seismic Exploration Fundamentals*, 1978, Penwell Press, Tulsa, Okla.

Telford, W. M., Geldart, L. P., Sheriff, R. E., and Keys, D. A., 1978, *Applied Geophysics*, Cambridge University Press, N.Y.

Yilmaz, Ozdogan, 1987. *Seismic Data Processing*, Society of Exploration Geophysicists.

What is claimed is:

1. A method of seismic exploration for use with a seismic survey collected over a predetermined portion of the subsurface of the earth, said predetermined portion of the subsurface of the earth containing structural and stratigraphic features associated with the generation, migration, accumulation, or presence of hydrocarbons, said seismic survey having a plurality of seismic traces associated therewith, each of said plurality of seismic traces containing at least one seismic event therein, comprising the steps of:

(a) selecting a seismic trace from among said plurality of seismic traces, said selected seismic trace having a surface location associated therewith;

(b) identifying a reference seismic event in said selected seismic trace;

(c) determining a time location of said identified seismic event;

(d) selecting at least one different seismic trace from said plurality of seismic traces, each of said selected at least one different seismic traces being located proximate to said surface location of said selected seismic trace;

(e) identifying a comparison event in at least one of said selected different seismic traces, each of said identified comparison events being at least approximately proximate in time to said time location of said identified seismic event;

(f) calculating a similarity coefficient between said identified seismic event and at least one of said at least one selected comparison events;

(g) assigning a same event ID number to said reference event and any comparison event wherein said calculated similarity coefficient exceeds a predetermined value;

(h) storing at least said assigned event ID number, a value representative of said determined time location, and said associated surface location, in an ID database;

(i) performing steps (b) through (h) at least once;

(j) performing steps (a) through (i) at least twice; and, (k) utilizing said ID database to identify said structural and stratigraphic features associated with the generation, migration, accumulation, or presence of hydrocarbons.

2. A method of seismic exploration according to claim 1, wherein step (h) includes the steps of:

(h1) determining a seismic amplitude associated with said reference event, and, (h2) storing said assigned event ID number, a value representative of said determined time location, a value representative of said seismic amplitude, and said associated surface location, in an ID database.

3. A method of seismic exploration according to claim 1, wherein said similarity coefficient of step (f) is an RB factor.

4. A method of seismic exploration according to claim 1, wherein step (d) includes the step of selecting at least four different seismic traces from said plurality of seismic traces, each of said selected different seismic traces being located proximate to said surface location of said selected seismic trace.

5. A method of seismic exploration according to claim 1, wherein step (k) includes the steps of:

(k1) accessing said ID database;

(k2) displaying at least a portion of said ID database in the form of a map for use in the identification of said structural and stratigraphic features associated with the generation, migration, accumulation, or presence of hydrocarbons.

6. A method according to claim 1, wherein said reference event is a single seismic peak.

7. A device adapted for use by a digital computer wherein a plurality of computer instructions defining the method of claim 1, are encoded, said device being readable by said digital computer, and, said computer instructions programming said computer to perform said method.

8. A device according to claim 7, wherein said device is selected from the group consisting of computer RAM, computer ROM, flash RAM, a PROM chip, a RAM card, a magnetic tape, a magnetic disk, a magneto-optical disk, an optical disk, a DVD disk, or a CD-ROM.

9. A method of seismic interpretation, wherein is provided the ID database of claim 1, comprising the steps of:

(a) accessing said ID database;

(b) accessing at least a portion of said plurality of seismic traces;

(c) displaying at least a portion of said accessed seismic traces;

(d) selecting one of said displayed seismic traces;

(e) picking one of said events in said selected seismic trace;

(f) determining from said picked event and said ID database whether said picked event has an ID number associated therewith;

(g) reading from said ID database any events corresponding to said associated ID number; and, (h) posting on said displayed seismic traces at least a portion of any events read from said ID database corresponding to said associated ID number.

10. A method of seismic exploration, wherein is provided a seismic survey collected over a predetermined portion of the subsurface of the earth containing structural and stratigraphic features associated with the generation, migration, accumulation, or presence of hydrocarbons, said seismic survey having a plurality of seismic traces associated therewith, each of said plurality of seismic traces having an identifier associated therewith, and, each of said plurality of seismic traces containing at least one seismic event therein, comprising the steps of:

(a) accessing at least a portion of said seismic survey;

(b) selecting a seismic trace from among said plurality of seismic traces, said selected seismic trace having a selected identifier associated therewith;

(c) identifying a reference seismic event in said selected seismic trace;

(d) determining a time location of said identified seismic event;

(e) selecting at least one different seismic trace from said plurality of seismic traces, each of said selected at least one different seismic traces being proximate to said selected seismic trace;

(f) identifying a comparison event in at least one of said selected different seismic traces, each of said identified comparison events being at least approximately proximate in time to said time location of said identified seismic event;

(g) calculating a similarity coefficient between said identified seismic event and at least one of said at least one selected comparison events;

(h) assigning a same event ID number to said reference event and any comparison event wherein said calculated similarity coefficient exceeds a predetermined value;

(i) storing at least said assigned event ID number, a value representative of said determined time location, and a value representative of said selected identifier in an ID database;

(j) performing steps (c) through (i) at least once;

(k) performing steps (a) through (j) at least twice; and, (l) utilizing said ID database to identify said structural and stratigraphic features associated with the generation, migration, accumulation, or presence of hydrocarbons.

11. A device adapted for use by a digital computer wherein a plurality of computer instructions defining the method of claim 10, are encoded, said device being readable by said digital computer, and, said computer instructions programming said computer to perform said method.

12. A device according to claim 11, wherein said device is selected from the group consisting of computer RAM, computer ROM, flash RAM, a PROM chip, a RAM card, a magnetic tape, a magnetic disk, a magneto-optical disk, an optical disk, a DVD disk, or a CD-ROM.

13. A method according to claim 10, wherein said reference seismic event is a trough.

14. A method according to claim 10, wherein said reference seismic event is a complex seismic event.

15. A method of seismic interpretation, wherein is provided a stacked 3-D seismic data volume collected over a predetermined portion of the subsurface of the earth containing structural and stratigraphic features associated with the generation, migration, accumulation, or presence of hydrocarbons, said stacked data volume containing a plurality of seismic traces therein, each of said seismic traces being uniquely identified by trace identifier, and, each of said seismic traces containing at least one seismic event, each of said seismic events being associated with a seismic reflection time, and, wherein is further provided a plurality of event IDs, each of said event IDs being associated with at least one of said seismic traces and each of said event IDs being associated with a particular reflection time on each of said associated seismic traces, comprising the steps of:

(a) accessing at least a portion of said seismic data volume;

(b) selecting a seismic trace from among said plurality of seismic traces, said selected seismic trace having a selected trace identifier associated therewith;

(c) selecting a seismic event from said selected seismic trace;

(d) identifying a reflection time associated with said selected seismic event;

(e) using at least said identified reflection time and said selected trace identifier to select a particular event ID from among said plurality of event IDs corresponding to said selected seismic event;

(f) identifying each seismic reflection time associated with said particular event ID; and, (g) displaying at least a portion of any seismic reflection times so identified, said displayed reflection times being for use in the identification of any of said stratigraphic or structural features in seismic exploration.

16. A method according to claim 15, wherein said plurality of event IDs are contained in a database.

17. A device adapted for use by a digital computer wherein a plurality of computer instructions defining the method of claim 15, are encoded, said device being readable by said digital computer, and, said computer instructions programming said computer to perform said method.

18. A device according to claim 17, wherein said device is selected from the group consisting of computer RAM, computer ROM, flash RAM, a PROM chip, a RAM card, a magnetic tape, a magnetic disk, a magneto-optical disk, an optical disk, a DVD disk, or a CD-ROM.

* * * * *